(12) United States Patent
Wulfsohn et al.

(10) Patent No.: US 9,503,274 B2
(45) Date of Patent: Nov. 22, 2016

(54) SYSTEM FACILITATING USER ACCESS TO CONTENT STORED OR EXPOSED ON CONNECTED ELECTRONIC COMMUNICATION DEVICES

(71) Applicants: Ronald Wulfsohn, Jerusalem (IL); Jacob Benjamin, Jerusalem (IL); Harry Fox, Jerusalem (IL); Moshe Rubin, Jerusalem (IL)

(72) Inventors: Ronald Wulfsohn, Jerusalem (IL); Jacob Benjamin, Jerusalem (IL); Harry Fox, Jerusalem (IL); Moshe Rubin, Jerusalem (IL)

( * ) Notice: Subject to any disclaimer, the term of this patent is extended or adjusted under 35 U.S.C. 154(b) by 103 days.

(21) Appl. No.: 14/192,155

(22) Filed: Feb. 27, 2014

(65) Prior Publication Data
US 2015/0244808 A1    Aug. 27, 2015

(51) Int. Cl.
*H04L 29/08* (2006.01)
*H04L 12/28* (2006.01)

(52) U.S. Cl.
CPC ....... *H04L 12/2818* (2013.01); *H04L 12/2812* (2013.01); *H04L 67/104* (2013.01)

(58) Field of Classification Search
CPC . H04L 67/141; H04L 65/4069; H04L 67/04; H04L 67/26; G06F 17/30743
See application file for complete search history.

(56) References Cited

U.S. PATENT DOCUMENTS

| | | | | |
|---|---|---|---|---|
| 2006/0013219 | A1* | 1/2006 | Neilson | G06F 11/1464 370/389 |
| 2006/0239131 | A1* | 10/2006 | Nathan | G11B 19/025 369/30.06 |
| 2007/0265003 | A1* | 11/2007 | Kezys | H04L 12/66 455/435.1 |
| 2010/0124196 | A1* | 5/2010 | Bonar | H04B 7/0689 370/329 |
| 2011/0078018 | A1* | 3/2011 | Chunilal | G06F 17/30867 705/14.48 |
| 2011/0167145 | A1* | 7/2011 | Bush | H04L 12/2807 709/223 |
| 2011/0196973 | A1* | 8/2011 | Shaheen | H04L 67/148 709/228 |
| 2011/0219123 | A1* | 9/2011 | Yang | H04L 29/12103 709/227 |
| 2012/0179829 | A1* | 7/2012 | George | H04L 61/2564 709/227 |
| 2014/0206348 | A1* | 7/2014 | Johnsson | H04W 8/005 455/434 |
| 2014/0258441 | A1* | 9/2014 | L'Heureux | H04W 12/06 709/217 |
| 2014/0259147 | A1* | 9/2014 | L'Heureux | H04L 63/02 726/14 |
| 2015/0128199 | A1* | 5/2015 | Kuo | H04L 61/1535 725/110 |
| 2015/0134853 | A1* | 5/2015 | Verwoerd | H04L 61/2514 709/245 |

* cited by examiner

*Primary Examiner* — Tu Nguyen
(74) *Attorney, Agent, or Firm* — Malina & Associates PLLC

(57) ABSTRACT

A communication system facilitating the establishment of a channel of communication for multiple electronic communication devices includes a registration server. The system also includes a plurality of enabled electronic communication devices in communication with the registration server. Each of the plurality of enabled electronic communication devices including an application programming interface enabling communication with the registration server. The communication server further includes a local communication network and a global communication network. If the plurality of enabled electronic communication devices are in the local communication network, communication amongst the plurality of enabled electronic communication device is established using the local communication network and if the plurality of electronic communication devices are not in the local communication network, communication amongst the plurality of enabled electronic communication device is established using the global communication network.

38 Claims, 9 Drawing Sheets

US 9,503,274 B2

SYSTEM FACILITATING USER ACCESS TO CONTENT STORED OR EXPOSED ON CONNECTED ELECTRONIC COMMUNICATION DEVICES

BACKGROUND OF THE INVENTION

1. Field of the Invention

The present application is directed to a system allowing users access to content that is stored or exposed on any other connected electronic communication device.

2. Description of the Related Art

Computers and mobile devices can connect to each other over some form of data network in order to enable connected devices to access content on other devices connected to the data network. Because these networks are designed to be either connectivity centric, device centric or OS (operating system) centric, access and use of the content have one or more of the following limitations:

- Only devices connected to the same network (LAN, WAN, Wi-Fi, etc.) can be connected to each other;
- Files can be copied from one device to another but not viewed/played;
- Only one device may be connected at a time;
- Only files stored locally may be accessed on a device's drive(s) or memory, but online content that the connected device has access while it is connected to the network cannot be accessed;
- Files can be PULLED (a user can access a file on a connected device) and played on the device without copying but the user cannot PUSH (decide what file will be displayed/played) content to another device;
- Files can be PUSHED from a device to one or more other devices but the connected device cannot access/PULL content from the device PUSHING the content;
- All connected devices need to be running the same Operating System type; and
- Once connected, remote access software allows a user to take control of a remote device, but during that session both devices only allow access to the content of the remote device and the user temporarily loses access to the local content.

SUMMARY OF THE INVENTION

It is, therefore, an object of the present invention to provide a communication system facilitating the establishment of a channel of communication for multiple electronic communication devices including a registration server. The system also includes a plurality of enabled electronic communication devices in communication with the registration server. Each of the plurality of enabled electronic communication devices including an application programming interface enabling communication with the registration server. The communication server further includes a local communication network and a global communication network. If the plurality of enabled electronic communication devices are in the local communication network, communication amongst the plurality of enabled electronic communication device is established using the local communication network and if the plurality of electronic communication devices are not in the local communication network, communication amongst the plurality of enabled electronic communication device is established using the global communication network.

It is also an object of the present invention to provide a communication system wherein the registration server facilitates seamless switching between use of local communication networks and global communication networks.

It is another object of the present invention to provide a communication system wherein the local communication network is a Wi-Fi network or a LAN subnet.

It is a further object of the present invention to provide a communication system wherein each of the enabled electronic communication devices includes an application in a form of computer software specifically adapted for implementing procedural steps and functionalities.

It is also an object of the present invention to provide a communication system including a Peer-To-Peer rendezvous server providing for firewall and network address translation traversal.

It is another object of the present invention to provide a communication system wherein the Peer-To-Peer rendezvous server implements STUN, TURN or ICE protocols.

It is a further object of the present invention to provide a communication system wherein enabled electronic communication devices have the ability to view content, stream media content, transfer content or move or delete content of any other enabled electronic communication device.

It is also an object of the present invention to provide a communication system wherein files can be both PUSHED and PULLED from one enabled electronic communication device to another enabled electronic communication device.

It is another object of the present invention to provide a communication system including REMOTE CONTROL features allowing an enabled electronic communication device to take control of another enabled electronic communication device.

It is a further object of the present invention to provide a communication system wherein the plurality of enabled electronic devices are selected from the group consisting of a computer, a cellular phone, a tablet computer, a Lync box, a television set, and a NAS drive.

It is also an object of the present invention to provide a communication system wherein the registration server provides enabled electronic communication devices with a list of potential peers with whom the enabled electronic communication device may open a channel of communication.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
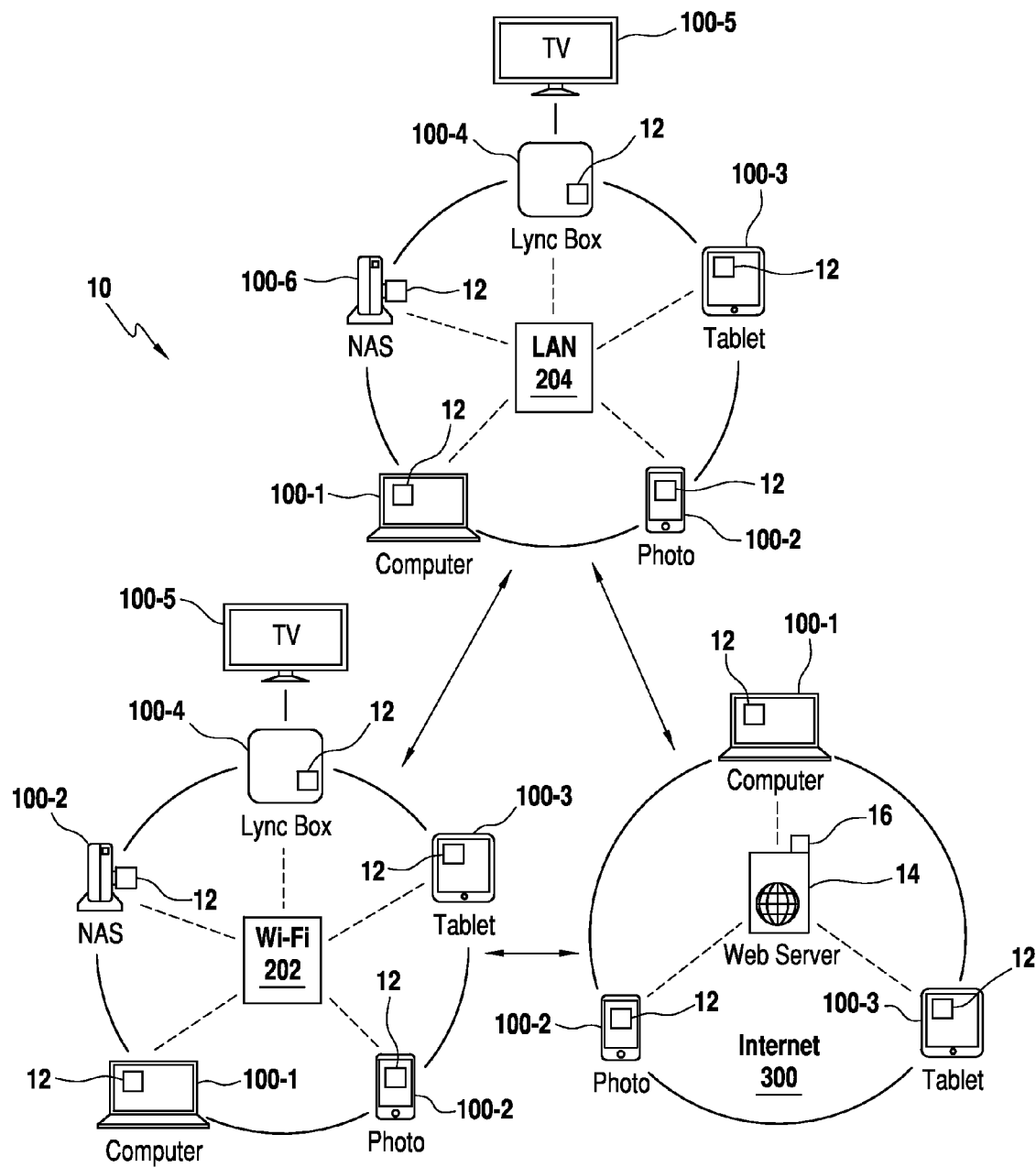
FIG. 1 is a schematic showing the different components in a network and the different networks that can communicate with each other, either via a Wi-Fi network or over the Internet.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

As will be appreciated based upon following disclosure and the various figures, the present invention provides for connectivity between electronic communication devices through available technology at the time the connection is made. This can include technologies allowing for connectivity between electronic communication devices when the electronic communication devices are in close proximity such as LAN, Wi-Fi, Bluetooth & Wi-Fi direct or when the electronic communication devices are located remotely from each other using Peer-To-Peer (P2P) technology over the Internet. The present invention also provides for the ability to seamlessly switch the connection methodology when a better one becomes available. e.g., remotely connected electronic communication devices that move into close proximity. Such a switch might be from P2P technology over the Internet to local Wi-Fi. The present invention also provides the ability to simultaneously connect many devices and provide a framework for an arbitrary communication protocol between the connected electronic communication devices giving users of the present invention complete freedom to send any information whatsoever between the electronic communication devices.

As will be explained below in greater detail, the present invention incorporates a specific implementation for sharing and controlling media playback that includes sharing of any media available to the electronic communication device. This includes media which is not local to the electronic communication device but to which the electronic communication device has access (e.g., by being connected to a third electronic communication device). The present invention also provides for the ability to copy & stream media either by PULL or PUSH methodology, i.e., any electronic communication device can initiate the copy/stream, as well as the ability to control playback of media on a remote electronic communication device.

More particularly, the present invention enables multiple electronic communication devices 100 to establish a channel of communication amongst the electronic communication devices 100. The communication channel is created in a manner allowing the fastest communication amongst the electronic communication devices 100. For example, if the electronic communication devices 100 are in the same local communication network, for example, a Wi-Fi zone 202 or a LAN subnet 204, the mode of communication provided by the local communication network 202, 204 will be employed. Otherwise, the connection of the plurality of electronic communication devices 100 is established on a global communication network 300 using P2P technology.

It is appreciated that as Wi-Fi Direct becomes more ubiquitous, this will also become an option. It is appreciated that Wi-Fi Direct is a Wi-Fi standard enabling electronic communication devices to connect without the need for a wireless access point. This is achieved by embedding a software access point into any device supporting Wi-Fi Direct. Using Wi-Fi Direct multiple electronic communication devices can be connected simultaneously with each other, and each connection will have its own communication channel.

As will be appreciated based upon the following disclosure, the present invention also provides a framework for handling the communication protocol once the channel between the electronic communication devices 100 is open. The users of this invention have complete freedom to create their own protocols and the established channel can be used for any purpose whatsoever.

This is accomplished using the present communication system (or Dynamic Intelligent Content Network) 10 facilitating the establishment of a channel of communication for multiple enabled electronic communication devices 100. The system 10 includes a registration server 14 and a plurality of enabled electronic communication devices 100 in communication with the registration server 14. Each of the plurality of enabled electronic communication devices 100 is enabled for interaction with the registration server 14 via an application programming interface (API) 12 integrated into the enabled electronic communication devices 100. The API 12 thus includes the following facilities:

1. Ability to recognize the users and electronic communication devices 100 that are currently available for connection and the best technology for making the connection;
2. Establishing a channel of communication between the electronic communication devices 100;
3. A signal methodology if the communication channel is broken for any reason whatsoever;
4. A framework for sending an arbitrary protocol along the established communication channel; and
5. An internal web server to allow streaming of media from an electronic communication device 100.

In accordance with a preferred embodiment, each of the plurality of electronic communication devices 100 that are enabled for use in accordance with the present invention are provided with an application 100*a* (which includes the API 12), that is, computer software specifically adapted for implementing the procedural steps and functionalities associated with the present invention.

The system 10 also includes a local communication network 202, 204 and a global communication network 300. In practice, if the enabled electronic communication devices 100 are in the local communication network 202, 204, the registration server 14, working in conjunction with the applications 100*a* on the enabled electronic communication devices 100, establishes communication amongst the enabled electronic communication devices 100 using the local communication network 202, 204. If the enabled electronic communication devices 100 are not in the local communication network 202, 204, the registration server 14 establishes communication amongst the enabled electronic communication device 100 using the global communication network 300.

With the foregoing in mind, the present invention provides a Dynamic Intelligent Content Network 10. The Dynamic Intelligent Content Network 10 is CONTENT centric, enabling an electronic communication device 100 connected to the Dynamic Intelligent Content Network 10 to access any content that is stored or exposed on any other enabled electronic communication device 100 also connected to the Dynamic Intelligent Content Network 10. This effectively enables users to access "any content anywhere" provided the content is exposed to the network.

The client, that is, an electronic communication device 100 operating the application 100a under the control of a user of the present system 10, interfaces to the registration server, or engine, 14 of the present communication system 10 via the API 12. From the client's point of view, its world consists of peers (that is, other enabled electronic communication devices 100 operating the application 100a of users of the present communication system 10) that can be connected into sessions. The client requests a list of peers through the API 12. Upon a user's request initiated from the user's electronic communication device 100, the client requests, via the API 12, to connect to an identified peer to create a session. A client request to transfer media content is done by interacting through the API 12. It is the client's responsibility to manage the sessions, terminating a session when appropriate.

The engine, that is, the registration server, 14 is capable of supporting multiple session connecting technologies, such as P2P (Peer-To-Peer), Wi-Fi, Wi-Di, and DLNA. These technologies are supported in a generic fashion, enabling the Dynamic Intelligent Content Network 10 of the present invention to extend the technology to easily support other connection technologies.

In addition, and as will be explained below, the Dynamic Intelligent Content Network 10 makes use of the registration server 14 which is accessible to all clients (that is, all electronic communication device 100 operating the application 100a under the control of a user of the present system 10) over the Internet. Clients register with the registration server 14, which can then notify contacts (that is, peers of the client) as to the client's presence on the Dynamic Intelligent Content Network 10. Client searches for other potential contacts are done through the registration server 14.

It is appreciated that the connection of two clients of the present system may be more difficult based upon firewalls or routers running through network address translation which prevents direct connection between various enabled electronic communication devices 100.

However, the present communication system 10 incorporates software in the form of a P2P rendezvous server 16 that supports industry standard protocols such as STUN (Session Traversal Utilities for NAT), TURN (Traversal Using Relay NAT), and ICE (Interactive Connectivity Establishment). Support for these protocols guarantees firewall and network address translation traversal in nearly one hundred percent of all cases. With this in mind, a carrier strength P2P rendezvous server 16 is used to facilitate network address translation.

It is appreciated P2P rendezvous server 16 employs a protocol allowing a client to locate a peer and establish a communication session with that peer. Once the peer is located, the session is established. Such P2P rendezvous server functionalities are well known in the art and standard operating conventions will be employed in accordance with the present invention.

Once the communication channel is established, whether it be via a local communication network 202, 204 or a global communication network 300, clients may view all content on any peer electronic communication device 100 that is connected to it via a session, based on the application 100a of the peer electronic communication device 100 giving permission and exposing such content. Therefore, it will be possible to transfer/copy files to/from each enabled electronic communication device 100; and stream media from enabled electronic communication device 100 to enabled electronic communication device 100 without making a copy. It is appreciated that there are no limitations from that standpoint of the present system as the permissions that a client may place upon the content and the interaction of others with the content. Ultimately, it depends on how the software using the technology works; that is, it is an application decision and the underlying technology just allows transfer/viewing/streaming of what the other client application allows. As explained below in greater detail, once one or more enabled electronic communication devices 100 are connected in a session through the Dynamic Intelligent Content Network 10, any session member has full access to all content and file types on any or all of the connected enabled electronic communication devices 100 that those connected enabled electronic communication devices 100 have deemed possible to access. Consequently, the owner of the enabled communication device 100 can control which content is exposed. Individual content items or groups of items may be completely private or completely public. Additionally, individual items or groups of items can be designated for sharing with particular peers or groups of peers.

To accomplish this, the present Dynamic Intelligent Content Network 10 is totally agnostic to the data network to which it is connected and instead looks for other electronic communication devices 100 that are enabled for interaction via the present Dynamic Intelligent Content Network 10. It is further appreciated that the present Dynamic Intelligent Content Network 10 can also connect enabled electronic communication devices 100 that run on different operating systems.

Once one or more enabled electronic communication devices 100 are connected in a session through the Dynamic Intelligent Content Network 10, any session member has full access to all content and file types on any or all of the connected enabled electronic communication devices 100 that those connected enabled electronic communication devices 100 have deemed possible to access, and can:

View the content;
Stream the media content;
Transfer content; and/or
Move or delete content.

That is, the user can view/play the files without having to copy the file(s), copy the files and even move or delete the files on any/all of the enabled electronic communication devices 100 connected to the session via the Dynamic Intelligent Content Network 10. In other words connected enabled electronic communication devices 100 can simultaneously access local content and functionality as well as remotely access any content available to any other connected enabled electronic communication device 100. Also, connected electronic communication devices 100 can control any other connected electronic communication device 100. For example, the present system 10 may be utilized in sharing documents, photos, music, videos, contacts, calendar events, notes, SMS and/or MMS. Furthermore the present system 10 may be used to manipulate such data on the remote enabled electronic communication device 100 by modifying it and controlling media playback & viewing.

As a result, the present Dynamic Intelligent Content Network 10 enables all of the following capabilities:

Any enabled electronic communication device 100 can connect to the Dynamic Intelligent Content Network 10 no matter what type or location of data network the enabled electronic communication device 100 is connected to;

All accessible files/content on any enabled electronic communication device 100 can be accessed, viewed, copied or managed by any other enabled electronic communication device 100 connected to a session via the Dynamic Intelligent Content Network 10;

There is no technical limit to how many enabled electronic communication devices 100 can be connected and access at any given time;

A client may access files that are locally stored on a peer connected electronic communication device's drive(s) or memory and also access external content that the peer connected enabled electronic communication device 100 has access to while it is connected to the network; External content includes social network accounts, cloud storage, and any content available to the contact via storage connected it;

Files can be both PUSHED and PULLED from the client enabled electronic communication device 100 to one or more connected enabled electronic communication devices 100;

Once connected, the REMOTE CONTROL feature allows a client to take control of a connected enabled electronic communication device 100;

Connected enabled electronic communication devices 100 can each be running on different Operating System types; and Connected enabled electronic communication devices 100 can simultaneously access their own local content as well as remotely access and control any other connected enabled electronic communication device 100.

Referring to FIG. 1, the various components of the Dynamic Intelligent Content Network 10 in accordance with the present invention are disclosed. In particular, the Dynamic Intelligent Content Network 10 connects various enabled electronic communication devices 100, for example, a computer 100-1, a cellular phone 100-2, a tablet computer 100-3, a Lync box 100-4, a television set 100-5, and a NAS drive 100-6 all on the same Wi-Fi network 202. Similarly, the Dynamic Intelligent Content Network 10 connects a computer 100-1, a cellular phone 100-2, a tablet computer 100-3, a Lync box 100-4, a television set 100-5, and a NAS drive 100-6 all on the same LAN network 204.

The Dynamic Intelligent Content Network 10 also connects remote enabled electronic communication devices 100, for example, a computer 100-1, cellular phone 100-2, and a tablet computer 100-3 via a global communication network 300, for example, a general Internet network, using the registration server 14. As will be better appreciated based upon the following disclosure, when a Dynamic Intelligent Content Network enabled electronic communication device 100 starts up it will inform the registration server 14.

It is appreciated the computer 100-1 is a regular desktop or laptop computer and can be either Macintosh/Windows/Linux. The computer 100-1 behaves as both a server and a server client in the present Dynamic Intelligent Content Network 10, as it can both publish its own content to other enabled electronic communication devices 100, or consume content from other connected enabled electronic communication devices.

The cellular phone 100-2 is, for example, an iPhone, Android phone or Windows 8 phone. Once again the cell phone 100-2 can connect either over a Wi-Fi network 202 or across the Internet 300. The cell phone 100-2 can behave as both a server and server client as described above.

The tablet computer 100-3 is an enabled electronic communication device 100 such as an iPad or Android tablet, or Windows 8 tablet. Once again, the tablet computer 100-3 can be used as both a server client and a server in the Dynamic Intelligent Content Network 10 of the present invention.

The Lync Box 100-4 is a computer device that is typically connected as an external device to a television set 100-5 through an HDMI cable. Lync Box is a proprietary name for a computing device that interfaces wirelessly between a device that has system software installed and the TV or any device with a screen and an HDMI connector that can display digital media files. The Lync Box 100-4 can be an Android or Linux computer, or any computing device that runs the Dynamic Intelligent Content Network software on it. The aim is typically (but not restricted to) that the Lync Box 100-4 will act as a client application as described above. This implies that other Dynamic Intelligent Content Network electronic communication devices 100 will send content either from their own enabled electronic communication device 100, or from another Dynamic Intelligent Content Network electronic communication devices 100 to the Lync Box 100-4, and that the Lync Box 100-4 will then act as a "server client" to display that content. It is appreciated that the Lync Box 100-4 can be embedded inside the television set 100-5.

The NAS (Network Attached Storage) drive 100-6 is typically a computer that contains and manages a hard disk on a network that supplies the content on that hard disk to computers in the network. The Dynamic Intelligent Content Network 10 can run on a NAS drive 6 in such a situation. In this situation the NAS drive 6 will act as a Dynamic Intelligent Content Network Server. This implies that it will only publish its content to other Dynamic Intelligent Content Network electronic communication devices 100, but not consume content from other electronic communication devices.

All the enabled electronic communication devices 100 that have been described in this section can work in the framework of the Dynamic Intelligent Content Network 10 either through a Wi-Fi network 202, a LAN network 204 or through the general Internet network 300, or any combination. If connecting to electronic communication devices 100 through the Internet network 300, it is essential that connection first be performed through the registration server 14.

Figure 2:
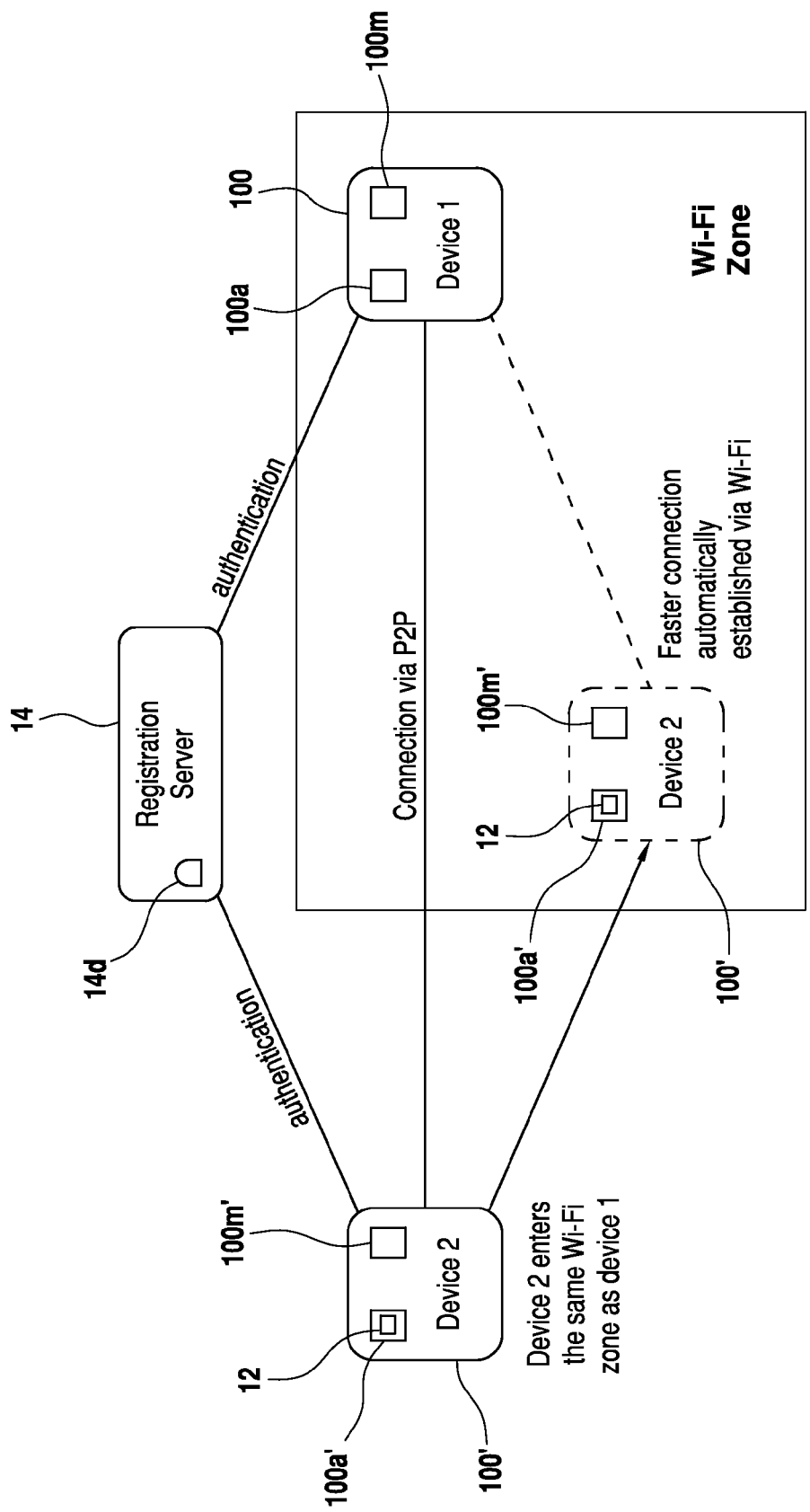
FIG. 2 is a functional diagram showing the transparent switching of communication channels from a globally based communication technology to a locally based communication technology when such becomes available.
Figure 3:
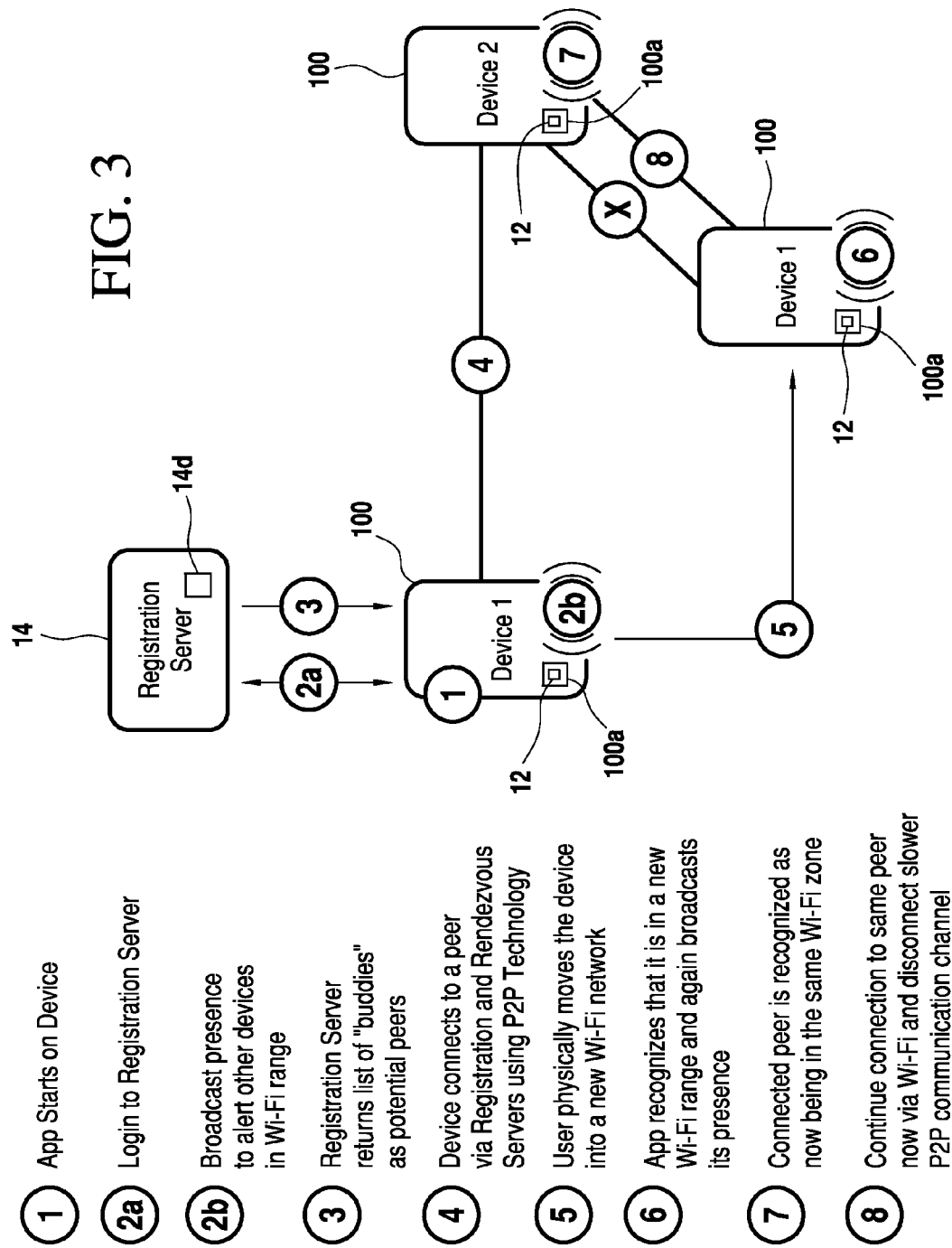
FIG. 3 is a flowchart showing the transparent switching of communication channels shown in FIG. 2 works.

In particular, and with reference to FIGS. 2 and 3, upon the initiation of the application 100$a$ (operating the Dynamic Intelligent Content Network 10 in accordance with the present invention) upon the electronic communication device 100, the user's electronic communication device 100 (that is, "Device 1") logs onto the registration server 14. Simultaneously, the user's electronic communication "Device 1" 100, under the control of the application 100$a$, broadcasts its presence to alert other electronic communication devices enabled for utilization on the present Dynamic Intelligent Content Network 10. After logging onto the registration server 14, the registration server 14 provides the electronic communication "Device 1" 100 with a list of "buddies" as potential peers (that is, other enabled electronic communication devices 100 operating the application 100$a$ of users of the present communication system 10 that can be connected into sessions) with whom the electronic communication "Device 1" 100 may open a communication channel. It is appreciated that each electronic communication device is assigned a unique ID and the list of "buddies" provided to Device 1 includes the unique ID for each buddy on the provided list. This list of "buddies" is stored within the memory 100m of the enabled electronic communication "Device 1" 100 by the application 100a.

Upon the designation by the user of an intent to contact a peer provided on the list of "buddies," the user's enabled electronic "Device 1" 100 will identify whether the peer is within a local network 202, 204 or within a global network 300. This is achieved by simply surveying the local network to identify electronic devices currently on the network in a manner known to those skilled in the art. Briefly, the identification is achieved by assigning each electronic communication device a unique ID. The ID of the peer electronic communication device returned by the registration server 14 is then matched against the broadcasted ID's of the electronic communication devices in the same Wi-Fi network. If a match is found, the peer electronic communication device is located within the Wi-Fi network and the connection is made by Wi-Fi. If the peer is not located within a Wi-Fi network 202 or LAN network 204 in close proximity to the user's electronic communication "Device 1" 100, the user's electronic communication "Device 1" 100 will connect with the peer, for example, user electronic communication "Device 2" (100'), with its own memory 100m' and application 100a', utilizing the registration server 14 and P2P rendezvous server 16 by employing P2P technology.

However, and as the user moves with his or her user electronic communication "Device 1" 100, the user may move into a new Wi-Fi network 202 in proximity with electronic communication "Device 2" (100'). In particular, the application 100a is programmed to broadcast the presences of the user's enabled electronic communication "Device 1" 100 each time it enters a new Wi-Fi network 202 or LAN 204. As such, and once the application 100a running on the user's electronic communication "Device 1" 100 recognizes that it is in a new Wi-Fi network 202, it will once again broadcast its presence. Upon the broadcast of the user's electronic communication "Device 1" 100 within the new Wi-Fi zone 202, the fact that electronic communication "Device 2" is within Wi-Fi zone 202 is recognized and the user's enabled electronic communication "Device 1" 100 determines it is within the same Wi-Fi zone 202 as electronic communication "Device 2" (100'). As the user's electronic "Device 1" 100 and electronic communication "Device 2" (100') are within the same Wi-Fi network 202, the application 100a closes or disconnects the P2P communication channel and the communication channel via the Wi-Fi network 202 is opened.

As explained above, when a Dynamic Intelligent Content Network electronic communication device 100 starts up it will inform the registration server 14 that it is alive and on the network 10. The registration server 14 will retain this information in its own internal database 14d, so that when other enabled electronic communication devices 100 would like to connect to this enabled electronic communication device 100, the other enabled electronic communication devices 100 will also go and register with the registration server 14 as previously described, and collect information from the registration server 14 that is stored within the memory 100m of the enabled electronic communication device 100 to help establish this connection. Once the connection between two enabled electronic communication devices 100 has been established then all the server client/server functionality described above can take place. The data maintained by the registration server 14 is structured in a hierarchy associating each user with all of their electronic communication devices. The record for a specific electronic communication device requires at least the following fields: Device name, unique device ID, internes address information for use by the rendezvous server and whether the device is online or not. It also needs to maintain the list of users that have agreed to be buddies with each other. With this information, applications implementing the present invention have knowledge of all of a user's buddies and electronic communication devices and whether each electronic communication device is online or not.

The idea is that each of the components can communicate with each other in the manner described above either via a Wi-Fi network 202, LAN network 204 or over the Internet 300. When operating in the Wi-Fi network 202 or the LAN network 204, the enabled electronic communication devices 100 will directly connect to each other and recognize each other's presence automatically with the assistance of the registration server 14, which as described above functions upon the initiation of the application 100a on the electronic communication device 100 to provide the electronic communication device 100 with a list of "buddies" as potential peers. When operating through the Internet 300, the connection will be performed using the registration server 14 for identification.

The aims of the enabled electronic communication devices 100 in the network described above are for both consumption of content from other enabled electronic communication devices 100 in the Dynamic Intelligent Content Network 10, or publishing of its own content to other enabled electronic communication devices 100 in the Dynamic Intelligent Content Network 10.

The way this content is accessed by other enabled electronic communication devices is in one of three ways:
1. Viewing their existence on an enabled electronic communication device 100;
2. Transferring them from one enabled electronic communication device 100 to another enabled electronic communication device 100; and/or
3. Directly accessing them from another enabled electronic communication device 100 (for example streaming music and videos).

The types of components that may exist in the Dynamic Intelligent Content Network 10 are, but not limited to, those enabled electronic communication devices 100 shown in FIG. 1. Each of these enabled electronic communication devices 100 (with the exception of the NAS drive 100-6) can act either as a "server"—an enabled electronic communication device 100 that publishes its own content or content accessible to it for others to access, or as a "server client"—an enabled electronic communication device 100 that accesses content from other "servers" in the Dynamic Intelligent Content Network 10, or both.

Establishing the Communication Channel

Figure 4:
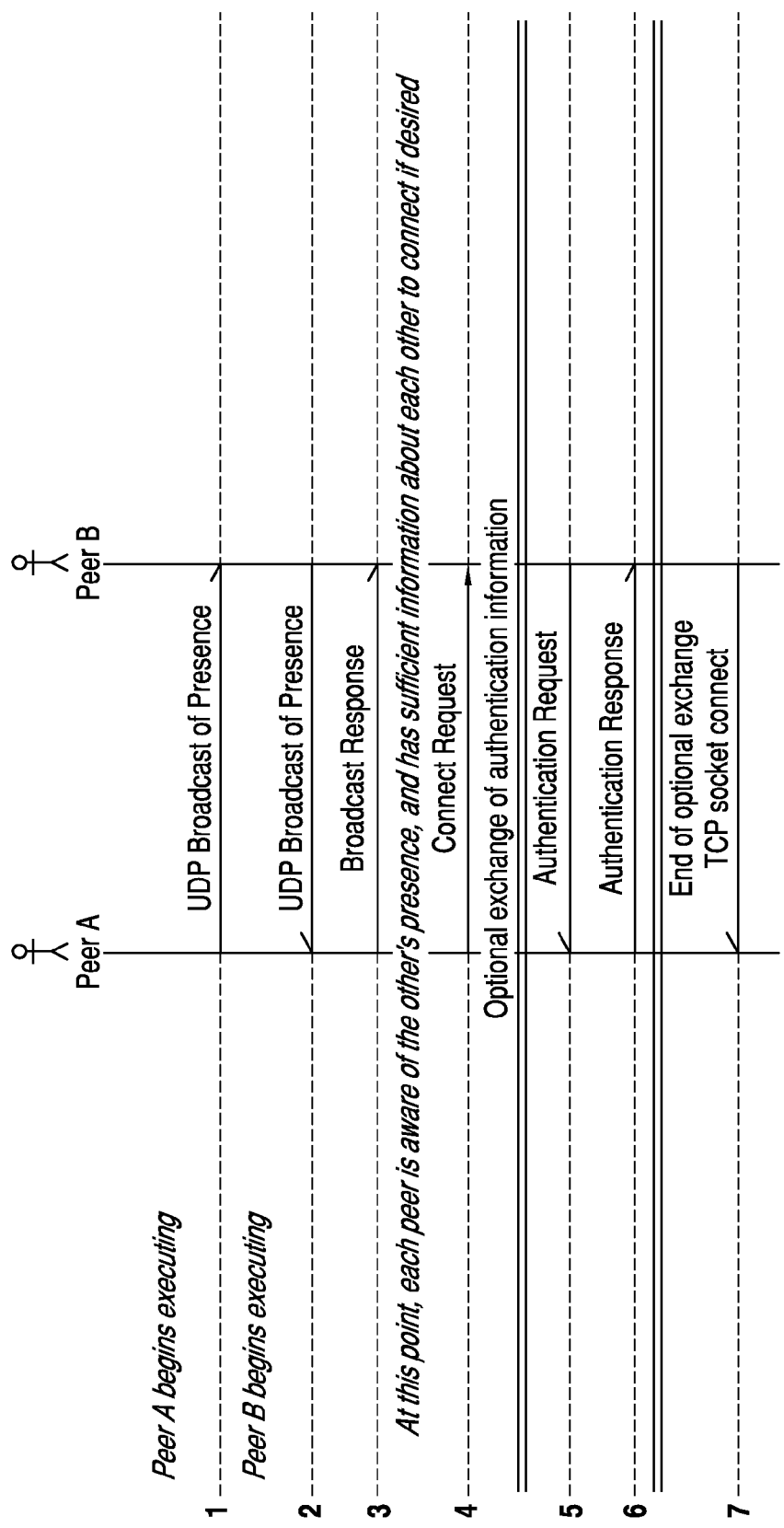
FIG. 4 is a description of a methodology used for electronic communication devices in close proximity to connect over Wi-Fi.

Referring to FIG. 4, a sequence diagram showing the interaction between the components needed to connect two enabled electronic communication devices 100, which are respective peers of each other, over a Wi-Fi or LAN network 202, 204:

Upon startup all enabled electronic communication devices 100, through the application 100a running on the enabled electronic communication devices 100, begin a sequence of User Datagram Protocol broadcasts or multicasts to announce their presence. These messages can continue infinitely or for a limited time. A peer receiving one of these messages will know that another Dynamic Intelligent Content Network enabled electronic communication device 100 exists on the system 10 and, at this point, each peer is aware of the other's presence and has sufficient information about each other to connect if desired. With the peers' presence established, one of the peers, for example, Peer A, can query Peer B for its functional properties and decide to connect to it. This is achieved by Peer A sending a connection request.

Optionally, an exchange of authentication information may be required for the connection. If such is required, Peer B responds with an authentication request followed by an authentication response by Peer B.

Upon connection, a TCP socket connection is established and the channel for communication between the peers is established. It is appreciated that connection implies sharing all the content and access to all the functionality allowable between the peers. The connection can be dependent on the exchange of authentication information.

Figure 5:
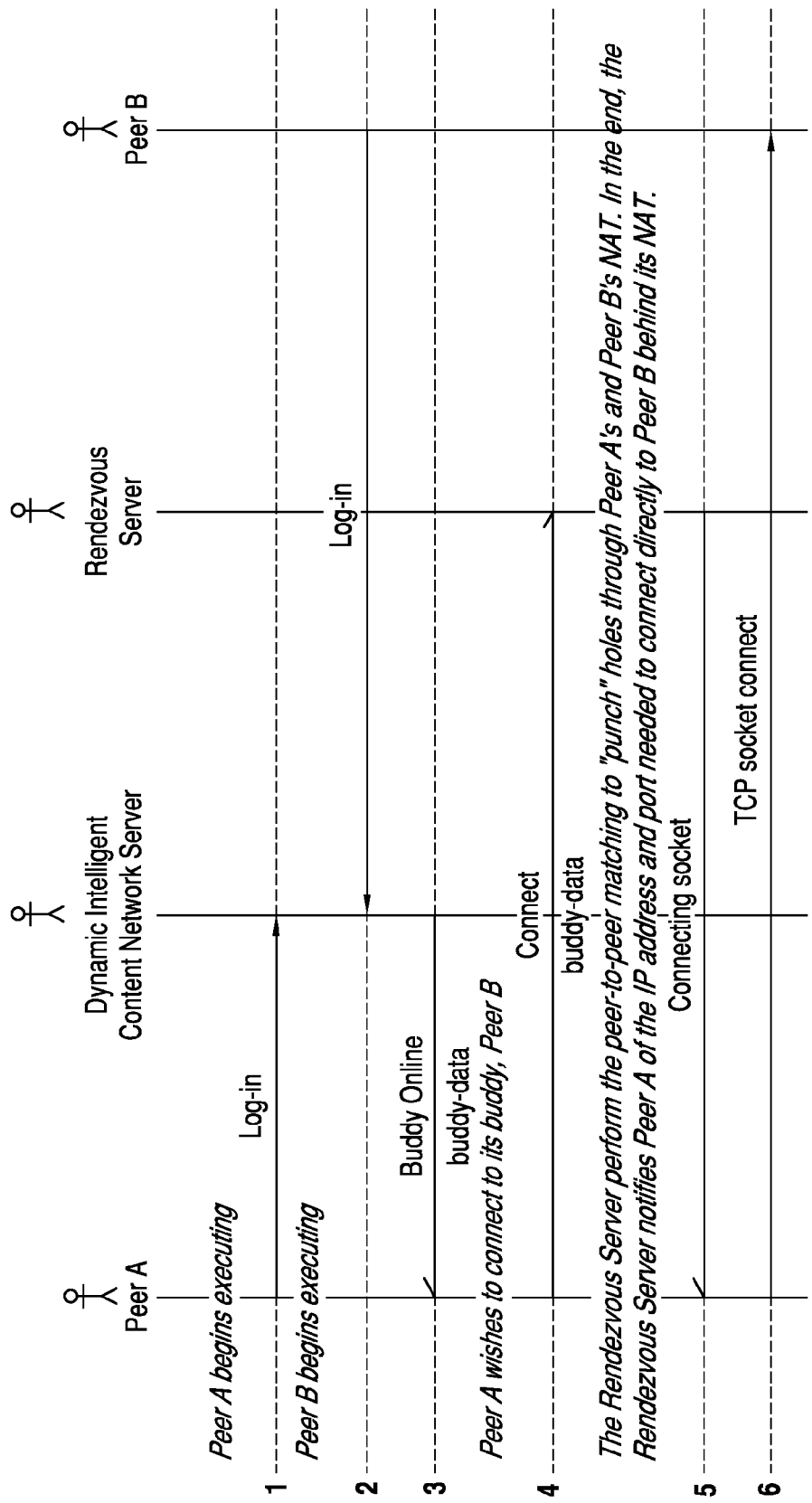
FIG. 5 is a description of a methodology used for remote electronic communication devices to connect over the Internet.

Referring to FIG. 5 a sequence diagram showing the interaction between the components needed to connect two peers over the Internet is provided. In particular, Peer A first logs into the system 10 via the registration server 14 and Peer B also logs into the system 10 via the same registration server 14. Thereafter, the rendezvous server 16 implements the STUN, TURN and ICE protocols for NAT traversal as discussed above. After Peer A and Peer B have logged into the system 10, the registration server 14 identifies that Peer A wishes to connect with Peer B. With this in mind, Peer A and Peer B are connected via transfer from the server 14 of each other's "buddy-data". In particular, the rendezvous server 16 performs the Peer-To-Peer matching to punch holes through Peer A's and Peer B's network address translation. In the end, the rendezvous server 16 notifies Peer A of the IP address and port needed to connect directly to Peer B behind the network address translation. With Peer A and Peer B connected, the TCP socket connects Peer A to Peer B directly.

Figure 6:
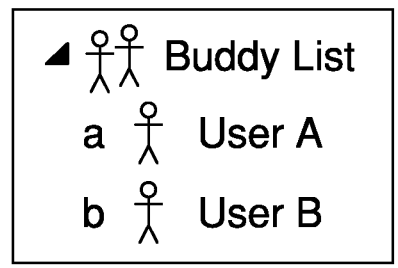
FIG. 6 is an interface showing a list of buddies that are currently available for connection.

As mentioned above, the present Dynamic Intelligent Content Network 10 is user centric. It can be used to associate a number of electronic communication devices with a single user which has ramifications for content aggregation. With reference to FIG. 6, a hypothetical user interface in accordance with the present invention is shown. Where the user requests a list all of its buddies, the enabled electronic device will might show the interface of FIG. 6 based upon information received from the registration server 12. This means that the local user can see two buddies: User A and User B (that is, the electronic communication devise(s) of User A and User B). However, and from the local user's point-of-view, he/she is dealing with people (User A and User B), not electronic communication devices.

Figure 7:
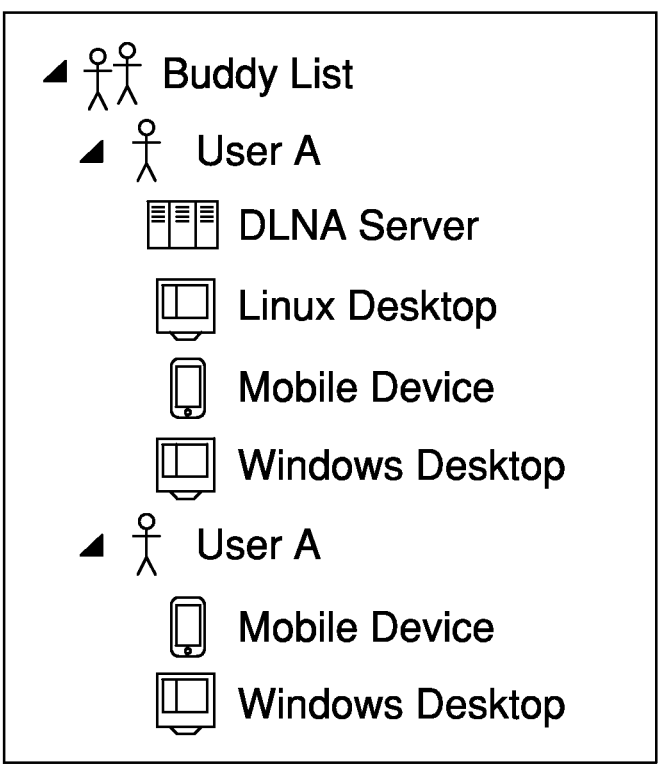
FIG. 7 is an interface showing how users can have many registered electronic communication devices, allowing buddies to simultaneously connect to one or more.

If in accordance with the present invention and with reference to FIG. 7, the user tree is expanded, it is apparent the present invention allows for the identification of all enabled electronic communication devices 100 associated with the User A (a DLNA server, a Linux Desktop, a Mobile Device and a Windows Desktop) and User B (a Mobile Device and a Windows Desktop).

The point is that, because the present system 10 requires enabled electronic communication devices 100 to log-in in association with a person, the registration server 14 groups all of a user's enabled electronic communication devices 100 under his/her username, thus giving a person (or user)-centric feel to the content management. It is, however, appreciated the local user may select a specific electronic communication device 100 to connect to, but the default can be to connect to a person, leaving it up to the present system 10 to decide which enabled electronic communication device 100 to connect to.

As a corollary to this, the present system 10 may present a user with all of their own enabled electronic communication devices 100. This has ramifications for example in allowing a user to connect to their own enabled electronic communication device 100 without requiring authentication.

Consider two users of the present system residing in the same corporate office or home environment. When each user begins executing, their respective enabled electronic communication devices 100 will register with the registration server 14. If they are mutually authenticated, they will see each other as peers—their technical means of connectivity is via P2P technology. In parallel, however, their enabled electronic communication devices 100 will discover that they both reside on the same Wi-Fi network 202. The present system 10 will therefore see them once again as peers, this time potentially connected via the Wi-Fi network 202. The point is that the present system 10 prefers to use the more efficient and economical means of connectivity. In the case above, it prefers to use the Wi-Fi connection for media management rather than the more 'expensive' P2P method using the Internet.

Should one of the peers exit the Wi-Fi network 202 (e.g., leaving the building), the present system 10 will switch seamlessly to the next means of connectivity (e.g., P2P).

Viewing a Peer's Content

Figure 8:
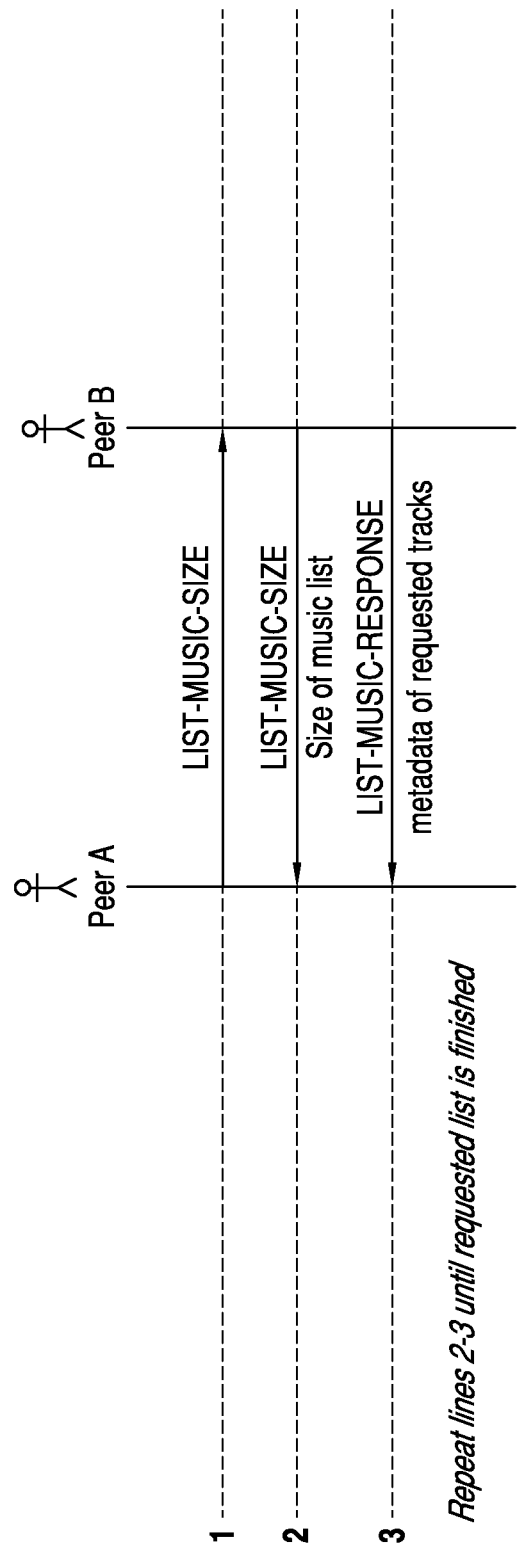
FIG. 8 shows the protocol used to retrieve the list of music from another electronic communication device.

With reference to FIG. 8, once the connection is established, any content Peer A wishes to share will be visible by Peer B. This can include content local to the enabled electronic communication device 100, content on Peer A's social networks or content on other owned or connected enabled electronic communication devices 100 belonging to Peer A.

Content from different sources can be published as separate units or aggregated into one big list. FIG. 8 shows one example how music information is shared between peers. In particular, Peer A indicates a desire to review a music list from Peer B. The size of the music list is first transmitted to Peer A. Thereafter, the metadata of the requested tracks is forwarded to Peer A. Steps two and three are repeated until the request list is finished. The same applies for all content types. All metadata can be made available to the requesting peer.

Existing media streaming technology is used to enable a connected enabled electronic communication device 100 to play content stored on another electronic communication device 100 without copying the file. Media is played on the local enabled electronic communication device 100 using the enabled electronic communication device 100's native media players and CODECs.

Besides having a view of each other's content and streaming media, each peer given the correct permissions can manipulate its peer's content. This may include streaming and file transfer (download). These activities are called "PULL" as Peer A is pulling the content from Peer B.

A unique feature of the present system resides in the fact that over and above "PULL" functionality, Peer A can initiate activities on Peer B. Examples of this would be telling Peer B to play a track with complete playback control or uploading a file to Peer B. The track can reside in Peer A's or Peer B's content domain. This type of functionality is called "PUSH".

Figure 9:
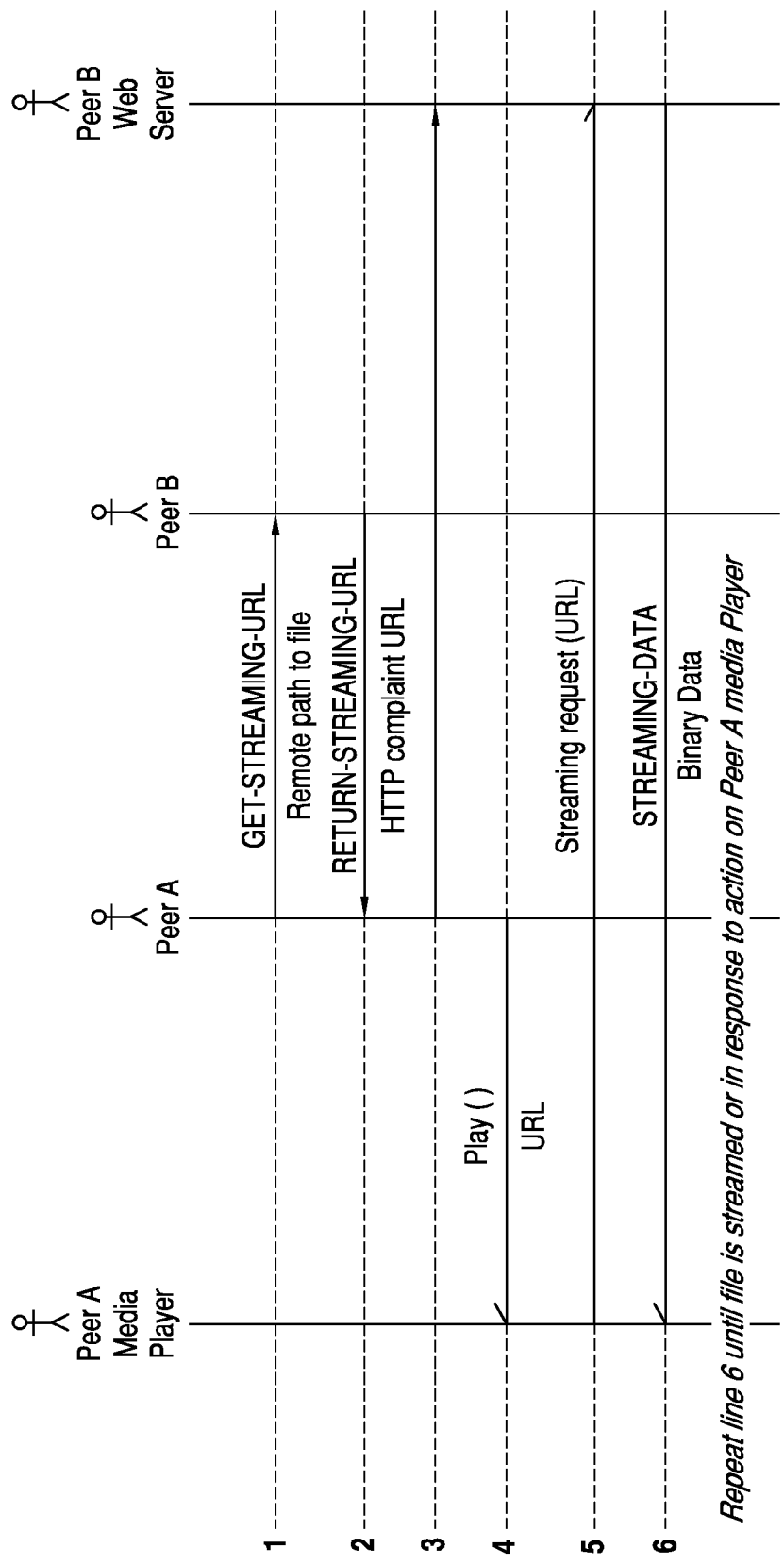
FIG. 9 is a diagram representing streaming media using pull methodology.
Figure 10:
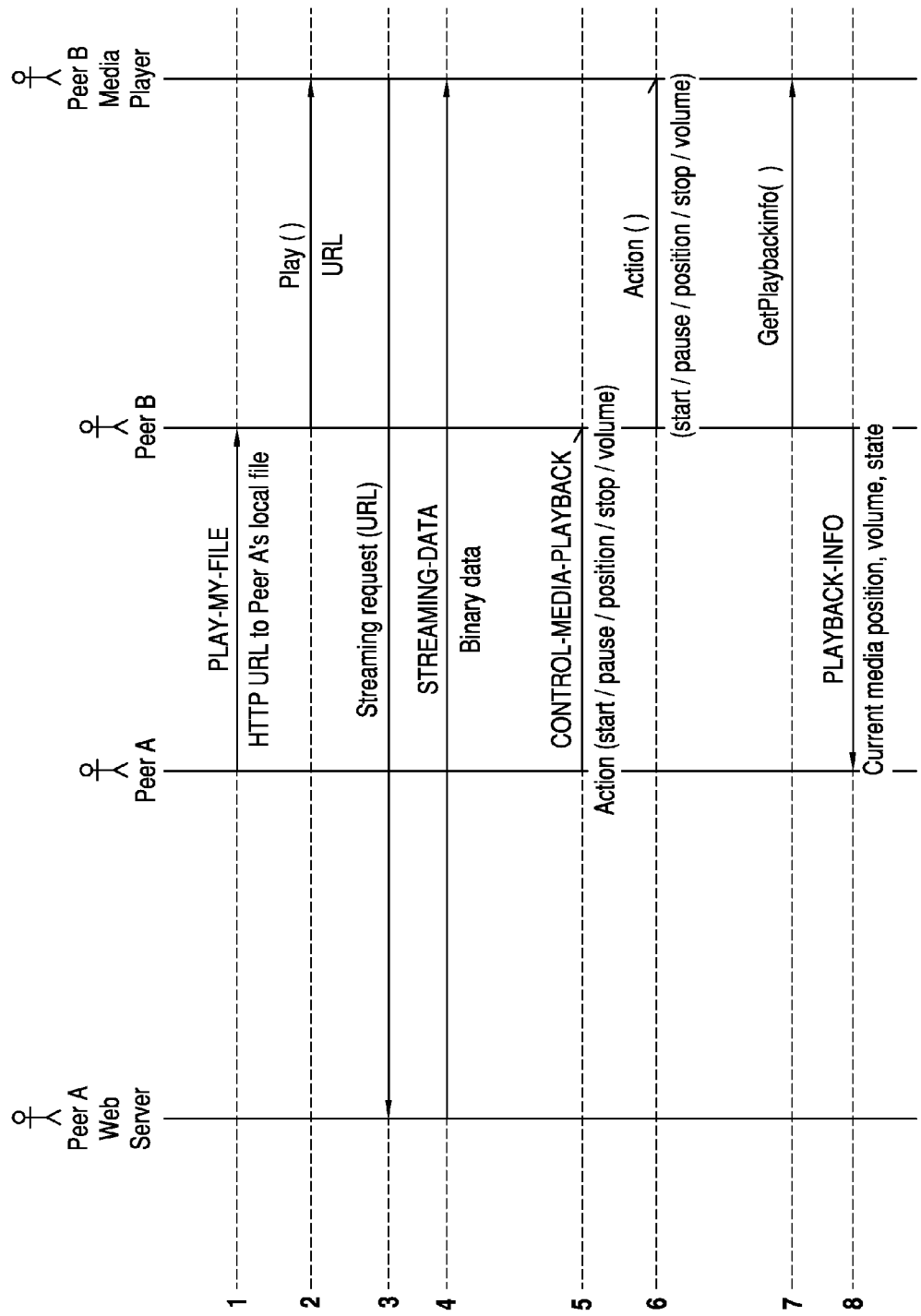
FIG. 10 is a diagram representing streaming media using push methodology.

Examples of PULL vs. PUSH can be seen in the subtle difference between the two block diagrams of streaming media shown in FIGS. 9 & 10. More particularly, Peer A transmits a Get-Streaming-URL request. This request asks Peer B for a URL identifying the location of streaming information. Peer B responds with a transmission of a return streaming message providing an HTTP compliant URL. Peer A then contacts the web server of Peer B with the HTTP compliant URL and Peer A initiates his or her own media player with the URL. Thereafter, the media player of Peer A provides a streaming request to the HTTP compliant URL associated with Peer B web server and Peer B web server will stream the data to Peer A media player. The final streaming step is continued until the file is complete or until a response or action on the part of Peer A to end the streaming.

In accordance with this mechanism, Peer A transmits a message for Peer B to "play my file." The transmission provides Peer B with the HTTP compatible URL to Peer A's local file for the data at hand. With this information in hand, Peer B contacts the Peer B media player with the URL and the Peer B media player sends a streaming request to the URL of the Peer A web server. Thereafter, Peer A web server will stream data to Peer B media player. With regard to control of the music, Peer A transmits a "control-media-playback signal" relating to various actions that may be taken via the Peer B media player. These actions may include start, pause, position, stop, volume, etc. These actions are transmitted from Peer A to the Peer B media player in conjunction with a get playback information request. The playback information request is obtained by transmitting current media position, volume, state from Peer B to Peer A.

The above diagram also shows that the present system offers the ability to control media playback on a remotely connected electronic communication device 100 enabled for use in accordance with the present invention. Besides the ability to PUSH media content as described above, full control of play, pause, stop, volume level and playback position is an integral part of the present system.

Since the entire system is in essence a server client/server relationship, the server can be completely in the background without any interference to the user in the normal operation of their enabled electronic communication device 100. Peer A can thus be viewing, streaming and transferring content to and from Peer B, while Peer B is totally immersed in another activity on their enabled electronic communication device 100.

As mentioned above, the software required for enabling an electronic communication device 100 to function in conjunction with the present system may be embedded on any enabled electronic communication device 100 that has access to the LAN or Wi-Fi network and optionally access to the Internet for the full P2P feature set. This allows the present system to drive the following electronic communication device 100 types:

NAS drives—Serve Dynamic Intelligent Content Network content; and

Dynamic Intelligent Content Network Renderer such as Lyric Box—Render Dynamic Intelligent Content Network content.

Both of these electronic communication device 100 types can optionally transparently connect to any or all electronic communication devices in a Dynamic Intelligent Content Network without a need for authentication.

It is also appreciated that aside from using the technology described above in accordance with the present invention on computers, mobile phones and tablets, the technology may also be implemented in cable set top boxes and Internet routers that connect to TV sets so that the TV set can access and play all the content that sits on any other electronic communication device 100 that has been connected.

Over and above the specific dynamic intelligent content network 10 capabilities, the present system provides OEMs (original equipment manufacturers) with applications that help move a user's content from any device/location to anywhere else. In conjunction with this endeavor, the present invention provides unique solutions that allow one to facilitate access, management, control and transfer of content from electronic communication device 100 to electronic communication device 100. The present invention enables any two electronic communication devices of any kind to connect to each other no matter where they are as long as the electronic communication devices are connected to a network that can be communicated with.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A communication system facilitating the establishment of a channel of communication for a plurality of enabled electronic communication devices which are part of an extended network including a global communications network and a local communication network, comprising:

a registration server configured to receive login registrations from electronic communication devices in the extended network, to store information about the registered electronic communication devices which are part of the extended network, and to provide information about the registered electronic communication devices in response to requests from devices in the extended network, wherein said information provided in response to a particular request identifies each of the registered electronic communication devices to which the particular requesting device can establish a communication channel through the extended network;

the plurality of enabled electronic communication devices being in communication with the registration server, each of the plurality of enabled electronic communication devices including an application programming interface enabling communication with the registration server and being configured to log-in to the registration server when joining the extended network;

the plurality of enabled electronic communication devices including a first enabled electronic communication device being in the local communication network and configured to:

(a) retrieve information from the registration server identifying all of the registered enabled electronic communication devices in the extended network to which connections can be made from the first enabled electronic communication device;

(b) receive a selection of a second enabled electronic communication device from among the registered specific enabled electronic communication devices in the extended network to which connections from the first enabled electronic communication device can be made; and (c) communicate with the second enabled electronic communication device over the local communication network upon a determination that the first and second enabled electronic devices are in the same local communication network, or otherwise to communicate with the second enabled electronic communication device over the global communication network using information received from the registration server about the second enabled electronic device;

wherein if the first and second enabled electronic communication devices are in the local communication network, communication between them is established using the local communication network and if the first and second enabled electronic communication devices are not in the same local communication network, communication between them is established using the global communication network.

2. The communication system according to claim 1, wherein the registration server provides information to facilitate seamless switching between use of local communication networks and global communication networks by the first enabled electronic communication device in communication with the second enabled electronic communication device.

3. The communication system according to claim 1, wherein the local communication networks is a Wi-Fi network or a LAN subnet.

4. The communication system according to claim 1, wherein each of the enabled electronic communication devices includes an application in a form of computer software specifically adapted for implementing procedural steps and functionalities.

5. The communication system according to claim 1, further including a Peer-To-Peer rendezvous server providing for firewall and network address translation traversal.

6. The communication system according to claim 5, wherein the Peer-To-Peer rendezvous server implements Session Traversal Utilities for NAT, Traversal Using Relay NAT, or Interactive Connectivity Establishment protocols.

7. The communication system according to claim 1, wherein enabled electronic communication devices have the ability to view content, stream media content, transfer content or move or delete content of any other enabled electronic communication device.

8. The communication system according to claim 1, wherein files can be both PUSHED and PULLED from one enabled electronic communication device to another enabled electronic communication device.

9. The communication system according to claim 1, further including REMOTE CONTROL features allowing an enabled electronic communication device to take control of another enabled electronic communication device.

10. The communication system according to claim 1, wherein the plurality of enabled electronic devices are selected from the group consisting of a computer, a cellular phone, a tablet computer, a Lync box, a television set, and a Networked Attached Storage drive.

11. The communication system according to claim 1, wherein the first enabled electronic communication device is configured to:
(a) upon detection that the first and second enabled electronic communication devices are in the same local communication network while communicating over the global communication network, establish a data connection with the second enabled electronic communication device over the respective local communication network and terminate the data connection over the global communication network; and
(b) upon detection that the first and second enabled electronic communication devices are no longer in the same local communication network after having established a communication link with the second enabled electronic communication device over that respective local communication network, establish a data connection with the second enabled electronic communication device over the global communication network.

12. The communication system according to claim 1, wherein each said enabled electronic communication devices is configured to, in response to entering a new local communication network, broadcast its presence on the new local communication network.

13. The system of claim 1, wherein the first enabled electronic communication device is further configured to display a list of the registered specific enabled electronic communication devices in the extended network to which connections from the first enabled electronic communication device can be made and from which the second device can be selected.

14. The system of claim 13, wherein each login registration includes a respective user name; wherein the information about the registered electronic communication devices provided by the registration server further indicates the user name associated with such registered electronic communication devices; and wherein the first enabled electronic communication device is configured to display the list organized according to the respective user names.

15. A system for communicating over an extended network including a global communications network and a local communication network, the system comprising:
a first electronic communication device connectable to the global communication network and the local communication network;
the first electronic communication device configured to:
(a) send a registration to a registration server as part of establishing a connection to the extended network;
(b) receive information from the registration server identifying each other electronic communication device connected to the extended network, registered with the registration server, and to which a data connection can be made by the first electronic communication device;
(c) receive a selection of a second enabled electronic communication device from among the identified enabled electronic communication devices in the extended network to which connections from the first enabled electronic communication device can be made;
(d) determine when the second electronic communication device is in the local communication network; and
(e) maintain a data connection with the second electronic communication device using the local communication network while the second electronic communication device is in the local communication network and otherwise using the global communication network.

16. The system of claim 15, wherein the first electronic communication device is further configured to broadcast its presence upon entering another local communication network.

17. The system of claim 15, wherein the first electronic communication device is configured to seamlessly switch between use of the local communication network and the global communication network in communications with the second electronic communication device responsive to detection of the second electronic communication device entering and leaving the local communication network.

18. The system of claim 15, wherein the first electronic communication device is selected from the group consisting of a computer, a cellular phone, a tablet computer, a Lync box, a television set, and a Networked Attached Storage drive.

19. The system of claim 15, wherein the first enabled electronic communication device is further configured to display a list of the registered specific enabled electronic communication devices in the extended network to which connections from the first enabled electronic communication device can be made and from which the second device can be selected.

20. The system of claim 19, wherein the information received from the registration server indicates a respective user name associated with each respective identified electronic communication device and wherein the first enabled electronic communication device is configured to display the list organized according to the respective user names.

21. A method for a first electronic communication device to communicate over an extended network including a global communications network and a local communication network, the method comprising the steps of:
    sending registration information associated with the first electronic communication device to a registration server as part of establishing a connection to the extended network:
    receiving information from the registration server identifying each other electronic communication device connected to the extended network, registered with the registration server, and to which a data connection can be made by the first electronic communication device;
    receiving a selection of a second electronic communication device from among the other identified electronic communication devices to which a data connection can be made by the first electronic communication device;
    determining when the second electronic communication device is in the local communication network; and
    maintaining a data connection with the second electronic communication device using the local communication network while the second electronic communication device is in the local communication network and otherwise using the global communication network.

22. The method of claim 21, further comprising the step of the first electronic communication device broadcasting its presence upon entering another local communication network.

23. The method of claim 21, further comprising the step of the first electronic communication device seamlessly switching between use of the local communication network and the global communication network in communications with the second electronic communication device responsive to detection of the second electronic communication device entering and leaving the local communication network.

24. The method of claim 21, wherein the first electronic communication device is selected from the group consisting of a computer, a cellular phone, a tablet computer, a Lync box, a television set, and a Networked Attached Storage drive.

25. The method of claim 21, further comprising the step of displaying a list of the registered specific enabled electronic communication devices in the extended network to which connections from the first enabled electronic communication device can be made and from which the second device can be selected.

26. The method of claim 25, wherein the step of sending registration information associated with the first electronic communication device to a registration server includes sending a user name associated with the first electronic communication device; the step of receiving information from the registration server includes receiving information identifying a respective user name associated with each respective identified electronic communication device; and the step of displaying further includes displaying the list organized according to the respective user names.

27. A method for facilitating communication for a plurality of enabled electronic communication devices which are part of an extended network including a global communications network and a local communication network, the method comprising the steps of:
    receiving at a registration server login registrations from enabled electronic communication devices in the extended network;
    providing from the registration server to a first enabled electronic communication device information identifying each specific enabled electronic communication device in the extended network registered with the registration server and to which a connection from the first enabled electronic communication device can be made;
    receiving at the first enabled electronic communication device a selection of a second enabled electronic communication device from among the enabled electronic communication devices in the extended network to which connections from the first enabled electronic communication device can be made;
    the first enabled electronic communication device establishing a connection with the second enabled electronic devices over the local communication network upon a determination that the first and second enabled electronic devices are in the same local communication network, or otherwise establishing a connection with the second enabled electronic communication devices over the global communication network.

28. The method of claim 27, further comprising the steps of:
    when the first and second enabled electronic communication devices are connected over the global communication network and upon detection that the first and second enabled electronic communication devices are in the same local communication network, establishing a data connection between the first and second enabled electronic communication devices over the local communication network; and
    when the first and second enabled electronic communication devices are connected over the local communication network and upon detection that the first and second enabled electronic communication devices are no longer in the same local communication network, establishing a data connection between the first and second enabled electronic communication devices over the global communication network.

29. The method of claim 28, wherein switching between use of local communication networks and global communication networks in communications between the first and second enabled electronic communication devices is seamless.

30. The method of claim 27, wherein the local communication network is a Wi-Fi network or a LAN subnet.

31. The method of claim 27, further comprising the step of providing firewall and network address translation traversal via a Peer-To-Peer rendezvous server.

32. The method of claim 31, wherein the Peer-To-Peer rendezvous server implements Session Traversal Utilities for NAT, Traversal Using Relay NAT, or Interactive Connectivity Establishment protocols.

33. The method of claim 27, further comprising the step of the first enabled electronic communication device accessing data content on the second enabled electronic communication device.

34. The method of claim 33, wherein the step of accessing data content comprises at least one of viewing content, streaming media content, transferring content, moving content, and deleting content.

35. The method of claim 27, further comprising the step of the first enabled electronic communication device remotely controlling features of the second enabled electronic communication device.

36. The method of claim 27, wherein the first enabled electronic communication device broadcasts its presence on a new local communication network in response to entering the new local communication network.

37. The method of claim 27, further comprising the step of displaying a list of the registered specific enabled electronic communication devices in the extended network to which connections from the first enabled electronic communication device can be made and from which the second device can be selected.

38. The method of claim 37, wherein the logon registrations received at the registration server include a respective user name associated with the respective electronic communication device logging in; the information provided by the registration server includes the user name associated with the identified specific enabled electronic communication devices; and the step of displaying further includes displaying the list organized according to the respective user names.

\* \* \* \* \*